United States Patent [19]

Illg

[11] Patent Number: 4,660,140
[45] Date of Patent: Apr. 21, 1987

[54] CONTROL ARRANGEMENT FOR A VEHICLE SEAT ADJUSTING MECHANISM HAVING A SELF CHECKING, REDUCED TERMINAL, MICROCOMPUTER

[75] Inventor: Thomas Illg, Bietigheim-Bissingen, Fed. Rep. of Germany

[73] Assignee: ITT Industries, Inc., New York, N.Y.

[21] Appl. No.: 672,114

[22] Filed: Nov. 16, 1984

[30] Foreign Application Priority Data

Nov. 17, 1983 [DE] Fed. Rep. of Germany ....... 3341472

[51] Int. Cl.$^4$ .............................................. G05B 9/02
[52] U.S. Cl. .................................. 364/184; 364/167; 364/171; 318/568; 318/466; 371/62
[58] Field of Search ............. 364/424, 167, 184, 171; 318/568, 466, 467, 468; 371/62

[56] References Cited

U.S. PATENT DOCUMENTS

| | | | |
|---|---|---|---|
| 4,267,494 | 5/1981 | Matsuoka et al. | 318/568 |
| 4,401,928 | 8/1983 | Kamijo et al. | 318/468 |
| 4,463,426 | 7/1984 | Caddick et al. | 364/424 |
| 4,467,252 | 8/1984 | Takeda et al. | 318/568 |
| 4,523,136 | 6/1985 | Dudeck et al. | 318/568 |
| 4,607,199 | 8/1986 | Krueger et al. | 364/424 |

Primary Examiner—Jerry Smith
Assistant Examiner—John R. Lastova
Attorney, Agent, or Firm—Donald J. Lenkszus

[57] ABSTRACT

There is disclosed a circuit arrangement comprising a microcomputer, wherein certain terminals of the microcomputer may be used as either input terminals or as output terminals under selective switching control so that a reasonably priced microcomputer with few terminals can be used to control complex functions such as those of a vehicle seat adjusting mechanism. The circuit arrangement also includes a program check arrangement wherein check pulses are superimposed with control signals at an output terminal. The check pulses are used by a multivibrator which resets the microcomputer when the check pulses are not periodic. The check pulses are short in duration and do not adversely affect the operation of a relay coupled to the output terminal.

15 Claims, 1 Drawing Figure

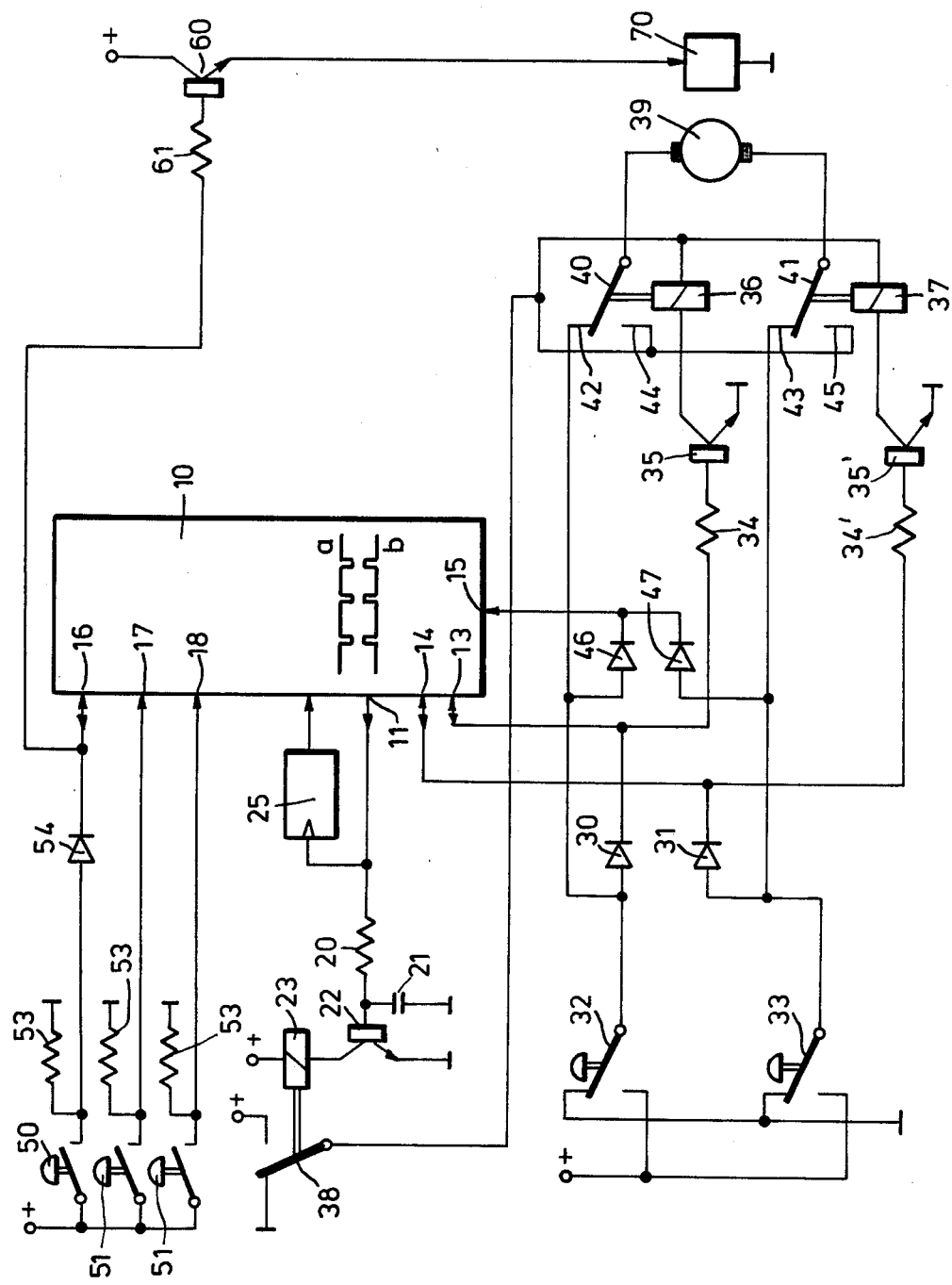

they can also be superimposed on a
CONTROL ARRANGEMENT FOR A VEHICLE SEAT ADJUSTING MECHANISM HAVING A SELF CHECKING, REDUCED TERMINAL, MICROCOMPUTER This invention relates to a circuit arrangement comprising a microprocessor or a microcomputer primarily adapted to control a seat adjusting device in a motor vehicle. The microcomputer has several terminals to be selectively used as inputs or outputs, and comprising at least one switch for input of data into the microcomputer and at least one load which is controllable by a control signal to be tapped off from one terminal of the microcomputer.

BACKGROUND OF THE INVENTION

The cost of a microcomputer as currently used to solve complex control problems depend to a great extent on the number of terminals through which signals are conductable to the microcomputer and through which control signals for the control of loads can be transmitted from the computer. The problem in controlling these costs is to lay out the entire circuit arrangement in such a way that a less expensive microcomputer with a smaller number of terminals can be used. One possible solution to this problem is by combining switches to form groups so that their switching positions can be detected via fixed-cycle interrogation pulses. A system of this kind has been described by the German specification No. OS 2 815 234. Another solution to this problem is to control particular loads in multiplex operation.

From the German specification No. OS 3 207 633, it is known that check pulses may be generated during a program run for supervising the functioning of a microcomputer. These check pulses may be picked up on one terminal of the microcomputer to trigger a retriggerable monostable multivibrator. If the check pulses on the input of this monostable multivibrator do not appear in given time intervals, the multivibrator is no longer triggered and the potential on the output of the multivibrator connected with the reset input of the microcomputer is changed, the change of potential indicating an error in the program run. At present such check pulses are picked up on a terminal of the microcomputer which is not used for the control of other functions.

In circuit arrangements for the control of a seat adjusting device in motor vehicles, the adjusting motors or the relays controlling these adjusting motors have been connected to separate terminals of the microcomputer. An embodiment of this kind is shown in the German specification No. OS 3 037 193. If it is assumed that four adjusting motors are used in a particular seat adjusting device, and the adjusting motors are controllable via eight relays for both directions of rotation, eight terminals are necessary to control these motors. An additional grouping of eight terminals to supervise the input switches is also needed. In a circuit arrangement of this kind a microcomputer with 32 terminals is necessary, so that the other necessary functions can also be carried out.

Also noted in U.S. Pat. No. 4,463,426 issued July 31, 1984 to Caddick et al. for microprocessor controlled vehicle seat position control.

SUMMARY OF THE INVENTION

The present invention is based on developing a circuit arrangement for a microcomputer or microprocessor which requires the lowest possible number of terminals on the microcomputer, the terminals being selectively connectable as input or output, so that a comparatively inexpensive microcomputer can be used. Of course the operational reliability should not be affected thereby.

One solution to this problem is to provide periodic short-time check pulses superimposed on a control signal for one load to be tapped off from one terminal of the microcomputer. The check pulses are periodically provided during the program run and control a monostable multivibrator which may be retriggered and whose output is connected with the reset input of the microcomputer.

The invention is thereby based on the consideration that the check pulses can also be superimposed on a longer lasting control signal for a load, if this load has an inert switching behavior or if a changeover of this load is retarded by electronic means, for example by a delay network. Because the pulse duration of these check pulses is very short, the load does not respond as long as the check pulse lasts. For example a relay or a glow lamp can be regarded as an inert load and on the control signal of this load short-time check pulses can be superimposed without malfunction.

Another solution to the basic problem is that the proper functioning of microcomputer terminals operable as either input or output terminals depends on a changeover signal provided by a switch and conducted to one terminal of the microcomputer. Thus the terminals of the microcomputer are used as input terminals at a given time and as output terminals at another time in dependence on the switching position of a switch. Thus both an input switch and a load can be connected with a terminal of the microcomputer. When this principle is applied to the circuit arrangement for the control of a seat adjusting mechanism, eight terminals on the microcomputer can be omitted, if all mentioned input switches for actuating the associated adjusting motors are connected with the terminal through which these adjusting motors or their relays are controlled.

BRIEF DESCRIPTION OF THE DRAWING

The invention and a plurality of advantageous embodiments are described hereafter in conjunction with the embodiments shown in the accompanying drawing. The drawing shows a simplified block diagram of a circuit for a seat adjusting device wherein only the principal features of the invention are shown, so that the circuit diagram remains clear.

DETAILED DESCRIPTION

The microprocessor or microcomputer shown in the box designated 10 has terminals 11 to 18 which are connected with several switches and loads via leads, as shown. The arrows on the leads symbolize whether the terminal in question can operate as an input terminal, as an output terminal or selectively as either an input or output terminal. Of course the microcomputer has further terminals for the voltage supply, necessary timing signal and the like which are not shown in detail in the drawing.

In the present embodiment, the terminal 11 serves only as an output for a control signal which controls a relay 23 as a load via a delay network including resistor 20, capacitor 21 and transistor 22. Furthermore, a monostable multivibrator 25 which may be retriggered is connected to the terminal 11. The output of this monostable multivibrator is connected with the reset input 12 of the microcomputer. The pulse sequences designated "a" and "b" may be measured on the output terminal 11 acting as the control signal. In the case of the pulse sequence "a" the relay 23 is energized, but in contrast thereto it is de-energized in the case of the pulse sequence "b". This output signal comes into existence in that during a program run a series of periodically released, short duration check pulses are superimposed on the control signal for the relay 23. If, during a program run, a given sequence of commands is completed, the control signal is inverted for a short duration. Thus the control signal changes over for a short time from a logic "1" level to a logic "0" level or vice versa. The short duration pulses do not affect the switching condition of the relay 23, because this relay operates in a relatively inert way and due to the fact that a supporting capacitor 21 is additionally provided which would have to be discharged or recharged prior to a changeover of the relay 23. During a regular program run, the monostable multivibrator 25 is retriggered again and again by these periodic, short duration check pulses, so that the potential on the output does not change. If, however, due to a faulty program run one check pulse is missing, the potential on the output of the multivibrator changes and the microcomputer is reset.

Thus it can be seen that the terminal 11 is used for two completely different functions. First, a load is switched on or off for a longer time and in addition short-time check pulses are picked up on this terminal 11 and evaluated by the multivibrator 25. In this case it is not a parallel control of two loads known in itself, which loads are switched on or off at the same time. Instead, on this terminal 11 a signal is provided in a form that can be evaluated by different loads, namely by the relay 23 and by the multivibrator, in a distinguishable manner.

By the measure described so far one terminal on the microcomputer 10 can be omitted as compared with the prior art. The omission of a single terminal may seem to be insignificant at first, but the only microcomputers available at present are those in which a number of terminals differ in several units. As a matter of fact in special cases even the omission of a single terminal can result in the use of a less expensive microcomputer.

Two further terminals 13 and 14 of the microcomputer 10 can selectively be connected as either input or output terminals. To these terminals are connected the respective input switches 32 and 33 via decoupling diodes 30 and 31. Data or input signals having logic "1" level or logic "0" level can be applied to terminals 13 and 14 over the respective switches 32 and 33. Terminals 13 and 14 of the microcomputer are each connected to a respective changeover relay 36 and 37 as loads via respective amplifiers. Each amplifier includes a resistor and transistor 34 and 35 and 34', 35' respectively. In the control circuits of these changeover relays 36 and 37 is inserted a common switching element, namely the contact 38 of the relay 23. The changeover relays 36 and 37 allow reversible control of an adjusting or seat positioning control members, namely motor 39. In the rest position of these changeover relays 36 and 37, the bridging contacts 40 and 41 connect the motor 39 with the input switches 32 and 33 via the stationary contacts 42 and 43. Consequently the seat adjusting motor 39 can be directly controlled via the input switches 32 or 33, which for this purpose must not only act as signal switches for the microcomputer 10, but also as load switches for the motor 39. In the operated position of the changeover relays 36 and 37 the associated bridging contacts 40 and 41 are connected with a stationary contact 44 or 45, which are connectable to either positive potential or ground potential via the contact 38 of the relay 23. In the operating position of a changeover relay 36 or 37 the motor is directly connected to a terminal of a suitable voltage source. Furthermore, the input switches 32 and 33 are interlinked via an OR-gate in the form of two diodes 46 and 47, whereby the output signals are conducted to a program interruption input 15 of the microcomputer 10.

The circuit arrangement operates as follows: The terminals 13 and 14 are normally connected as output terminals, so that during a program run the energization of the changeover relays 36 or 37 can be controlled by the microcomputer so that the motor 39 brings the adjusting mechanism into a predetermined position. If, however, one of the two input switches 32, 33 is actuated, a changeover signal on the program interruption input 15 is provided. Thereby the terminals 13 and 14 are connected without delay as input terminals and the microcomputer can recognize which of the two switches 32 and 33 is switched on. This information is necessary for a proper evaluation of the pulses of a speed sensor to be described later. If, for example, the input switch 32 is actuated, these speed pulses have to be added. Upon actuation of the input switch 33 the pulses have to be subtracted because of the changed direction or rotation. Furthermore the relay 23 is immediately de-energized by the changeover signal on the program interruption input 15, so that the control circuit for the changeover relays 36 and 37 is interrupted. Thereby the motor 39 is directly controlled via the actuated input switch 32.

Of course several motors with corresponding input switches are provided in the operative embodiment of a seat adjusting system using the present control arrangement. It is clear that the input switches and the associated loads (changeover relays) each are connected with a common terminal of the microcomputer, so that a plurality of terminals of the microcomputer can be omitted. Furthermore it is clear from the drawing that the function of terminals 13 and 14 depends on a changeover signal which is provided by an input switch and conducted to another terminal, namely to the program interruption input terminal 15. This program interruption input is in any case provided in usual microcomputers, so that this does not result in a higher amount of circuitry. Of course the changeover signal could also be conducted to one of the usual inputs of the microcomputer, however in this case the switching processes described above would be carried out with a certain delay time. During the actuation time of an input switch the terminals 13 and 14 are connected as input terminals, but otherwise are connected as output terminals. As a matter of fact in the present invention, the switching position of an input which determines the function of a terminal on the microcomputer, which can be connected with this input switch.

Further input switches can be seen in the drawing, namely a single set key 50 and two programming keys 51 and 52. In a seat adjusting arrangement the programming keys serve to bring the seat into a preprogrammed position in a known manner. If the seat is manually adjusted via the input switches 32 or 33 the seat position can be stored in a memory by a simultaneous actuation of one of the programming keys and of the set key 50. Thus it is only necessary to supervise the switching position of the set key 50, if previously one of the two programming keys 51 or 52 has been actuated. The set key 50 and the programming keys 51 and 52 are connected with the terminals 16, 17 and 18 on the microcomputer. The resistors 53 determine the potential on these terminals, when none of the keys has been actuated. The terminals 17 and 18 only serve as input, while the terminal 16 is selectively connectable as input or output.

A switching element, in the present case the transistor 60, is controlled through this terminal 16 via a resistor 61. The voltage supply of a sensor 70 is connected via this transistor 60. The sensor detects the movement or position of the adjusting member driven by the motor. The signal of this sensor 70 is conducted to the microcomputer 10, however this has not been shown in detail in the drawing. In order to reduce the current consumption of the entire circuit arrangement these sensors are switched off, when they are not needed by any known technique. Normally the terminal 16 is connected as output and via this terminal the transistor 60 can be blocked in the rest position. The transistor 60 is only connected through, when an operation of the adjusting mechanism is carried out. However the function of the terminal 16 depends on the switching position of the programming key 51 and 52. If one of these keys is actuated, the terminal 16 is connected as an input, so that the switching condition of the set key 50 can be detected via the decoupling diode 54. If this set key 50 is actuated, the transistor 60 is also controlled, but this is not a disadvantage, because the actuating process is very short and therefore the power consumption is only high for a short time. Thus the function of the terminal 16 of this example depends on the switching condition of a key which is not connected with this terminal 16. Consequently this example shows that the changeover signal determining the function of a given terminal can also be picked up on a terminal with which is connected another input switch, namely one of the programming keys 51 or 52.

In a concrete example shown, 10 out of 30 terminals on the microcomputer could be omitted due to the measures described above. This makes it possible to employ a reasonably priced microcomputer comprising only 20 terminals.

What is claimed is:

1. A circuit arrangement for controlling a seat adjusting mechanism in a motor vehicle, said circuit arrangement comprising: a microcomputer including a plurality of terminals selectively operable as either input or output terminals and a reset input; at least one switch for inputting data into the microcomputer; at least one load which is responsive to a continuous control signal provided at one of said terminals; said microcomputer including means for providing short-duration check pulses at said one terminal superimposed on said control signal during a program run of said microcomputer; a monostable multivibrator coupled to said one terminal for receiving said check pulses and having an output connected to said reset input of the microcomputer, said multivibrator resetting said microcomputer when said check pulses are aperiodic.

2. A circuit arrangement according to claim 1, wherein the microcomputer is arranged to periodically invert said control signal for a short time and to provide a check pulse in response to said inversion to maintain a condition of said load.

3. A circuit arrangement according to claim 1, further including a delay network coupled between said load and said one terminal for rendering said load unresponsive to said check pulses.

4. A circuit arrangement according to claim 1, wherein said load is a relay.

5. A circuit arrangement for controlling a seat adjusting mechanism in a motor vehicle comprising: a microcomputer including a plurality of terminals selectively operable as either input or output terminals and at least one additional terminal, and a switch coupled to said at least one additional terminal for providing a changeover signal, said plurality of terminals selectively operable as input or output terminals being responsive to said changeover signal provided by said switch.

6. A circuit arrangement according to claim 5, further including a load connected to one terminal of said plurality of terminals of said microcomputer and wherein said switch is also coupled to said one terminal, and upon actuation of said switch, said changeover signal is provided to said additional terminal to render said one terminal selectively operable as an input terminal.

7. A circuit arrangement according to claim 5, further including an OR-gate and including a plurality of said input switches and a plurality of said loads, wherein each said switch is arranged to control an associated load, wherein said switches and loads associated with one another are each coupled to a respective common one of said plurality of terminals of the microcomputer, and wherein said switches are interconnected by said OR-gate having an output connected with said additional terminal of the microcomputer, whereby upon actuation of one of said switches, the terminals associated with said switches are rendered selectively operable as input terminals.

8. A circuit arrangement according to claim 7, wherein said loads are changeover relays each having a rest position for connecting an associated electric adjusting member with its associated switch and an operating position for directly connecting the relay to a source of voltage, and wherein said arrangement further includes a control circuit for each said changeover relay and a switching element, said control circuits being controllable by said switching element, and wherein during the actuating time of one of said switching elements, said control circuits are interrupted.

9. A circuit arrangement according to claim 8, wherein said microcomputer includes an output terminal for providing superimposed check signals and control signals, and wherein said switching element is a supply relay coupled to said output terminal and includes a bridging contact controlled by the control signal superimposed with said check pulses.

10. A circuit arrangement according to claim 5, further including a second switch and a load coupled to one of said plurality of terminals, an input terminal and a third switch coupled to said input terminal, said one terminal being rendered operable as an input only during the actuating time of said third switch connected to said input terminal of the microcompuer.

11. A circuit arrangement according to claim 10, further including a current supply, a sensor, a motor, and an adjusting member, wherein said load is a switching element coupled to said current supply, wherein said sensor is arranged for detecting the movement or position of said adjusting member driven by said motor, and wherein said current is provided to said sensor only during certain time intervals, and is interrupted otherwise.

12. A circuit arrangement according to claim 11, wherein said microcomputer includes a set key, a memory and programming keys, and wherein said arrangement further includes input switches coupled to at least some of said plurality of terminals, wherein said switching element is connected to said one terminal of the microcomputer together with said set key, wherein said one terminal is switched as an input terminal when one of a plurality of said programming keys is actuated, wherein on actuation of one of said programming keys said adjusting mechanism is moved into a stored position and wherein upon simultaneous actuation of a programming key and of said set key a position of said adjusting member established by actuation of said input switches is stored in said memory.

13. A circuit arrangement according to claim 5, wherein said at least one additional terminal is a program interruption input of the microcomputer.

14. A system for controlling the position of a mechanism operated by at least one bidirectional motor, said system comprising: a positioning sensor, a motor, manually operable switches, and a microprocessor for providing a continuous control signal for controlling the operation of said motor in response to said manually operable switches and for receiving signals from said positioning sensor, said microprocessor having a plurality of terminals, a first plurlity of said terminals being operable as input terminals, a second plurality of terminals being operable as output terminals, and a third plurality of terminals being operable as either input or output terminals, a manually operated switch for each of said terminals of said third plurality, each said switch operable from a first position in which said microprocessor is connected to said motor for operation thereof over terminals of said third plurality used as output terminals from said microprocessor to a second position in which the terminals of said third plurality act as input terminals to said microprocessor indicative of the condition of said manual switches said microprocessor further including a reset terminal, means for providing short duration check pulses superimposed on said control signal during program control of said mechanism, and circuit means, connected to said reset terminal, for receiving said check pulses and for resetting said microprocessor when said check pulses are aperiodic.

15. A system as claimed in claim 14, including a further switch coupled to said microprocessor over a terminal of said third plurality for switching said last mentioned terminal of said third plurality coupled to said sensor between use as an output to said sensor or as an input to said microprocessor.

* * * * *